(12) United States Patent
Chui et al.

(10) Patent No.: US 10,163,249 B2
(45) Date of Patent: Dec. 25, 2018

(54) ARBITRARY VIEW GENERATION

(71) Applicant: Outward, Inc., San Jose, CA (US)

(72) Inventors: Clarence Chui, Los Altos Hills, CA (US); Manu Parmar, Sunnyvale, CA (US); Brook Seaton, Oakland, CA (US)

(73) Assignee: Outward, Inc., San Jose, CA (US)

( * ) Notice: Subject to any disclaimer, the term of this patent is extended or adjusted under 35 U.S.C. 154(b) by 0 days.

(21) Appl. No.: 15/721,421

(22) Filed: Sep. 29, 2017

(65) Prior Publication Data
US 2018/0053339 A1    Feb. 22, 2018

Related U.S. Application Data

(63) Continuation-in-part of application No. 15/081,553, filed on Mar. 25, 2016, now Pat. No. 9,996,914.

(60) Provisional application No. 62/541,607, filed on Aug. 4, 2017.

(51) Int. Cl.
| | |
|---|---|
| *G06T 5/50* | (2006.01) |
| *G06T 15/20* | (2011.01) |
| *G06T 7/32* | (2017.01) |
| *G06T 17/00* | (2006.01) |

(52) U.S. Cl.
CPC ............ *G06T 15/205* (2013.01); *G06T 5/50* (2013.01); *G06T 7/32* (2017.01); *G06T 17/00* (2013.01)

(58) Field of Classification Search
CPC . G06T 7/40; G06T 11/60; G06T 2207/10024; G06T 2207/10028; G06T 15/205; G06T 7/0051; G06T 7/0065; G06T 7/0077; G06T 7/0075; G06T 5/005; G06T 3/4038; H04N 1/3876; H04N 5/23238; G06K 2009/2045

See application file for complete search history.

(56) References Cited

U.S. PATENT DOCUMENTS

| | | |
|---|---|---|
| 6,222,947 B1 | 4/2001 | Koba |
| 2006/0280368 A1 | 12/2006 | Petrich |
| 2008/0143715 A1 | 6/2008 | Moden |
| 2011/0001826 A1 | 1/2011 | Hongo |
| 2012/0120240 A1 | 5/2012 | Muramatsu |
| 2012/0140027 A1 | 6/2012 | Curtis |
| 2013/0100290 A1 | 4/2013 | Sato |

*Primary Examiner* — Duy M Dang

(74) *Attorney, Agent, or Firm* — Van Pelt, Yi & James LLP

(57) ABSTRACT

Techniques for generating an arbitrary ensemble view from a plurality of other existing views are disclosed. In some embodiments, arbitrary view generation comprises retrieving a set of views corresponding to each of a plurality of objects, transforming the set of views of each of the plurality of objects to a requested perspective, and generating an ensemble view comprising the plurality of objects that has the requested perspective by combining pixels from the transformed sets of views of the plurality of objects.

54 Claims, 9 Drawing Sheets

ARBITRARY VIEW GENERATION

CROSS REFERENCE TO OTHER APPLICATIONS

This application is a continuation-in-part of U.S. Pat. No. 9,996,914 entitled ARBITRARY VIEW GENERATION filed Mar. 25, 2016, which is incorporated herein by reference for all purposes.

This application claims priority to U.S. Provisional Patent Application No. 62/541,607 entitled FAST RENDERING OF ASSEMBLED SCENES filed Aug. 4, 2017, which is incorporated herein by reference for all purposes.

BACKGROUND OF THE INVENTION

Existing rendering techniques face a trade-off between competing objectives of quality and speed. A high quality rendering requires significant processing resources and time. However, slow rendering techniques are not acceptable in many applications, such as interactive, real-time applications. Lower quality but faster rendering techniques are typically favored for such applications. For example, rasterization is commonly employed by real-time graphics applications for relatively fast renderings but at the expense of quality. Thus, improved techniques that do not significantly compromise either quality or speed are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for generating an arbitrary view of a scene are disclosed. The paradigm described herein entails very low processing or computational overhead while still providing a high definition output, effectively eliminating the challenging trade-off between rendering speed and quality. The disclosed techniques are especially useful for very quickly generating a high quality output with respect to interactive, real time graphics applications. Such applications rely on substantially immediately presenting a preferably high quality output in response to and in accordance with user manipulations of a presented interactive view or scene.

Figure 1:
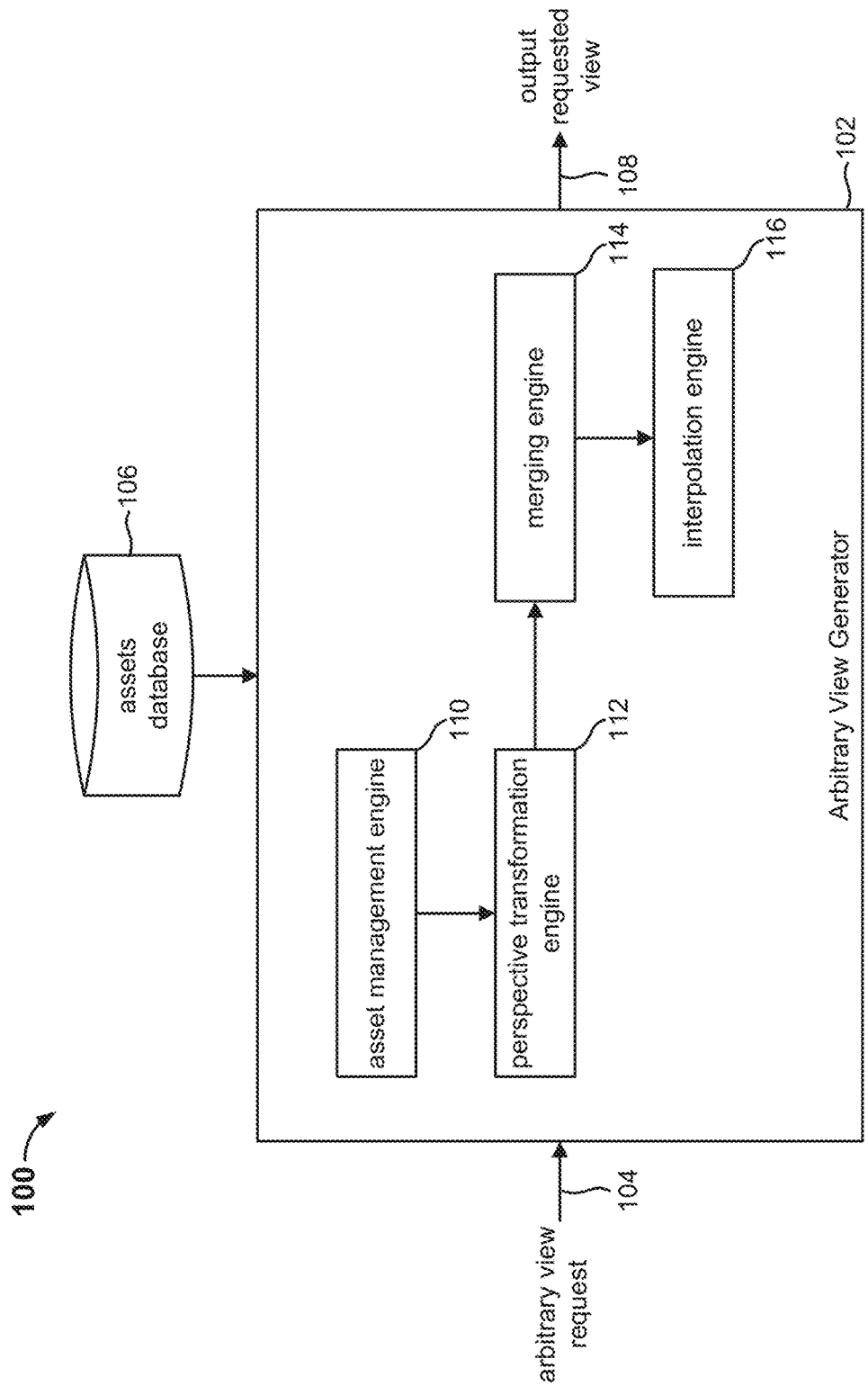
FIG. 1 is a high level block diagram illustrating an embodiment of a system for generating an arbitrary view of a scene.

FIG. 1 is a high level block diagram illustrating an embodiment of a system 100 for generating an arbitrary view of a scene. As depicted, arbitrary view generator 102 receives a request for an arbitrary view as input 104, generates the requested view based on existing database assets 106, and provides the generated view as output 108 in response to the input request. In various embodiments, arbitrary view generator 102 may comprise a processor such as a central processing unit (CPU) or a graphical processing unit (GPU). The depicted configuration of system 100 in FIG. 1 is provided for the purposes of explanation. Generally, system 100 may comprise any other appropriate number and/or configuration of interconnected components that provide the described functionality. For example, in other embodiments, arbitrary view generator 102 may comprise a different configuration of internal components 110-116, arbitrary view generator 102 may comprise a plurality of parallel physical and/or virtual processors, database 106 may comprise a plurality of networked databases or a cloud of assets, etc.

Arbitrary view request 104 comprises a request for an arbitrary perspective of a scene. In some embodiments, the requested perspective of the scene does not already exist in an assets database 106 that includes other perspectives or viewpoints of the scene. In various embodiments, arbitrary view request 104 may be received from a process or a user. For example, input 104 may be received from a user interface in response to user manipulation of a presented scene or portion thereof, such as user manipulation of the camera viewpoint of a presented scene. As another example, arbitrary view request 104 may be received in response to a specification of a path of movement or travel within a virtual environment, such as a fly-through of a scene. In some embodiments, possible arbitrary views of a scene that may be requested are at least in part constrained. For example, a user may not be able to manipulate the camera viewpoint of a presented interactive scene to any random position but rather is constrained to certain positions or perspectives of the scene.

Database 106 stores a plurality of views of each stored asset. In the given context, an asset refers to a specific scene whose specification is stored in database 106 as a plurality of views. In various embodiments, a scene may comprise a single object, a plurality of objects, or a rich virtual environment. Specifically, database 106 stores a plurality of images corresponding to different perspectives or viewpoints of each asset. The images stored in database 106 comprise high quality photographs or photorealistic renderings. Such high definition, high resolution images that populate database 106 may be captured or rendered during offline processes or obtained from external sources. In some embodiments, corresponding camera characteristics are stored with each image stored in database 106. That is, camera attributes such as relative location or position, orientation, rotation, depth information, focal length, aperture, zoom level, etc., are stored with each image. Furthermore, camera lighting information such as shutter speed and exposure may also be stored with each image stored in database 106.

Figure 2:
FIG. 2 illustrates an example of a database asset.

In various embodiments, any number of different perspectives of an asset may be stored in database 106. FIG. 2 illustrates an example of a database asset. In the given example, seventy-three views corresponding to different angles around a chair object are captured or rendered and stored in database 106. The views may be captured, for example, by rotating a camera around the chair or rotating the chair in front of a camera. Relative object and camera location and orientation information is stored with each generated image. FIG. 2 specifically illustrates views of a scene comprising a single object. Database 106 may also store a specification of a scene comprising a plurality of objects or a rich virtual environment. In such cases, multiple views corresponding to different locations or positions in a scene or three-dimensional space are captured or rendered and stored along with corresponding camera information in database 106. Generally, images stored in database 106 may comprise two or three dimensions and may comprise stills or frames of an animation or video sequence.

In response to a request for an arbitrary view of a scene 104 that does not already exist in database 106, arbitrary view generator 102 generates the requested arbitrary view from a plurality of other existing views of the scene stored in database 106. In the example configuration of FIG. 1, asset management engine 110 of arbitrary view generator 102 manages database 106. For example, asset management engine 110 may facilitate storage and retrieval of data in database 106. In response to a request for an arbitrary view of a scene 104, asset management engine 110 identifies and obtains a plurality of other existing views of the scene from database 106. In some embodiments, asset management engine 110 retrieves all existing views of the scene from database 106. Alternatively, asset management engine 110 may select and retrieve a subset of the existing views, e.g., that are closest to the requested arbitrary view. In such cases, asset management engine 110 is configured to intelligently select a subset of existing views from which pixels may be harvested to generate the requested arbitrary view. In various embodiments, multiple existing views may be retrieved by asset management engine 110 together or as and when they are needed by other components of arbitrary view generator 102.

The perspective of each existing view retrieved by asset management engine 110 is transformed into the perspective of the requested arbitrary view by perspective transformation engine 112 of arbitrary view generator 102. As previously described, precise camera information is known and stored with each image stored in database 106. Thus, a perspective change from an existing view to the requested arbitrary view comprises a simple geometric mapping or transformation. In various embodiments, perspective transformation engine 112 may employ any one or more appropriate mathematical techniques to transform the perspective of an existing view into the perspective of an arbitrary view. In the cases in which the requested view comprises an arbitrary view that is not identical to any existing view, the transformation of an existing view into the perspective of the arbitrary view will comprise at least some unmapped or missing pixels, i.e., at angles or positions introduced in the arbitrary view that are not present in the existing view.

Pixel information from a single perspective-transformed existing view will not be able to populate all pixels of a different view. However, in many cases, most, if not all, pixels comprising a requested arbitrary view may be harvested from a plurality of perspective-transformed existing views. Merging engine 114 of arbitrary view generator 102 combines pixels from a plurality of perspective-transformed existing views to generate the requested arbitrary view. Ideally, all pixels comprising the arbitrary view are harvested from existing views. This may be possible, for example, if a sufficiently diverse set of existing views or perspectives of the asset under consideration is available and/or if the requested perspective is not too dissimilar from the existing perspectives.

Any appropriate techniques may be employed to combine or merge pixels from a plurality of perspective-transformed existing views to generate the requested arbitrary view. In one embodiment, a first existing view that is closest to the requested arbitrary view is selected and retrieved from database 106 and transformed into the perspective of the requested arbitrary view. Pixels are then harvested from this perspective-transformed first existing view and used to populate corresponding pixels in the requested arbitrary view. In order to populate pixels of the requested arbitrary view that were not available from the first existing view, a second existing view that includes at least some of these remaining pixels is selected and retrieved from database 106 and transformed into the perspective of the requested arbitrary view. Pixels that were not available from the first existing view are then harvested from this perspective-transformed second existing view and used to populate corresponding pixels in the requested arbitrary view. This process may be repeated for any number of additional existing views until all pixels of the requested arbitrary view have been populated and/or until all existing views have been exhausted or a prescribed threshold number of existing views have already been used.

In some embodiments, a requested arbitrary view may include some pixels that are not available from any existing views. In such cases, interpolation engine 116 is configured to populate any remaining pixels of the requested arbitrary view. In various embodiments, any one or more appropriate interpolation techniques may be employed by interpolation engine 116 to generate these unpopulated pixels in the requested arbitrary view. Examples of interpolation techniques that may be employed include, for instance, linear interpolation, nearest neighbor interpolation, etc. Interpolation of pixels introduces averaging or smoothing. Overall image quality may not be significantly affected by some interpolation, but excessive interpolation may introduce unacceptable blurriness. Thus, interpolation may be desired to be sparingly used. As previously described, interpolation is completely avoided if all pixels of the requested arbitrary view can be obtained from existing views. However, interpolation is introduced if the requested arbitrary view includes some pixels that are not available from any existing views. Generally, the amount of interpolation needed depends on the number of existing views available, the diversity of perspectives of the existing views, and/or how different the perspective of the arbitrary view is in relation to the perspectives of the existing views.

With respect to the example depicted in FIG. 2, seventy-three views around a chair object are stored as existing views of the chair. An arbitrary view around the chair object that is different or unique from any of the stored views may be generated using a plurality of these existing views, with preferably minimal, if any, interpolation. However, generating and storing such an exhaustive set of existing views may not be efficient or desirable. In some cases, a significantly smaller number of existing views covering a sufficiently diverse set of perspectives may instead be generated and stored. For example, the seventy-three views of the chair object may be decimated into a small set of a handful of views around the chair object.

As previously mentioned, in some embodiments, possible arbitrary views that may be requested may at least in part be constrained. For example, a user may be restricted from moving a virtual camera associated with an interactive scene to certain positions. With respect to the given example of FIG. 2, possible arbitrary views that may be requested may be limited to arbitrary positions around the chair object but may not, for example, include arbitrary positions under the chair object since insufficient pixel data exists for the bottom of the chair object. Such constraints on allowed arbitrary views ensure that a requested arbitrary view can be generated from existing data by arbitrary view generator 102.

Arbitrary view generator 102 generates and outputs the requested arbitrary view 108 in response to input arbitrary view request 104. The resolution or quality of the generated arbitrary view 108 is the same as or similar to the qualities of the existing views used to generate it since pixels from those views are used to generate the arbitrary view. Thus, using high definition existing views in most cases results in a high definition output. In some embodiments, the generated arbitrary view 108 is stored in database 106 with other existing views of the associated scene and may subsequently be employed to generate other arbitrary views of the scene in response to future requests for arbitrary views. In the cases in which input 104 comprises a request for an existing view in database 106, the requested view does not need to be generated from other views as described; instead, the requested view is retrieved via a simple database lookup and directly presented as output 108.

Arbitrary view generator 102 may furthermore be configured to generate an arbitrary ensemble view using the described techniques. That is, input 104 may comprise a request to combine a plurality of objects into a single custom view. In such cases, the aforementioned techniques are performed for each of the plurality of objects and combined to generate a single consolidated or ensemble view comprising the plurality of objects. Specifically, existing views of each of the plurality of objects are selected and retrieved from database 106 by asset management engine 110, the existing views are transformed into the perspective of the requested view by perspective transformation engine 112, pixels from the perspective-transformed existing views are used to populate corresponding pixels of the requested ensemble view by merging engine 114, and any remaining unpopulated pixels in the ensemble view are interpolated by interpolation engine 116. In some embodiments, the requested ensemble view may comprise a perspective that already exists for one or more objects comprising the ensemble. In such cases, the existing view of an object asset corresponding to the requested perspective is employed to directly populate pixels corresponding to the object in the ensemble view instead of first generating the requested perspective from other existing views of the object.

As an example of an arbitrary ensemble view comprising a plurality of objects, consider the chair object of FIG. 2 and an independently photographed or rendered table object. The chair object and the table object may be combined using the disclosed techniques to generate a single ensemble view of both objects. Thus, using the disclosed techniques, independently captured or rendered images or views of each of a plurality of objects can be consistently combined to generate a scene comprising the plurality of objects and having a desired perspective. As previously described, depth information of each existing view is known. The perspective transformation of each existing view includes a depth transformation, allowing the plurality of objects to be appropriately positioned relative to one another in the ensemble view.

Generating an arbitrary ensemble view is not limited to combining a plurality of single objects into a custom view. Rather, a plurality of scenes having multiple objects or a plurality of rich virtual environments may be similarly combined into a custom ensemble view. For example, a plurality of separately and independently generated virtual environments, possibly from different content generation sources and possibly having different existing individual perspectives, may be combined into an ensemble view having a desired perspective. Thus, generally, arbitrary view generator 102 may be configured to consistently combine or reconcile a plurality of independent assets comprising possibly different existing views into an ensemble view having a desired, possibly arbitrary perspective. A perfectly harmonious resulting ensemble view is generated since all combined assets are normalized to the same perspective. The possible arbitrary perspectives of the ensemble view may be constrained based on the existing views of the individual assets available to generate the ensemble view.

Figure 3:
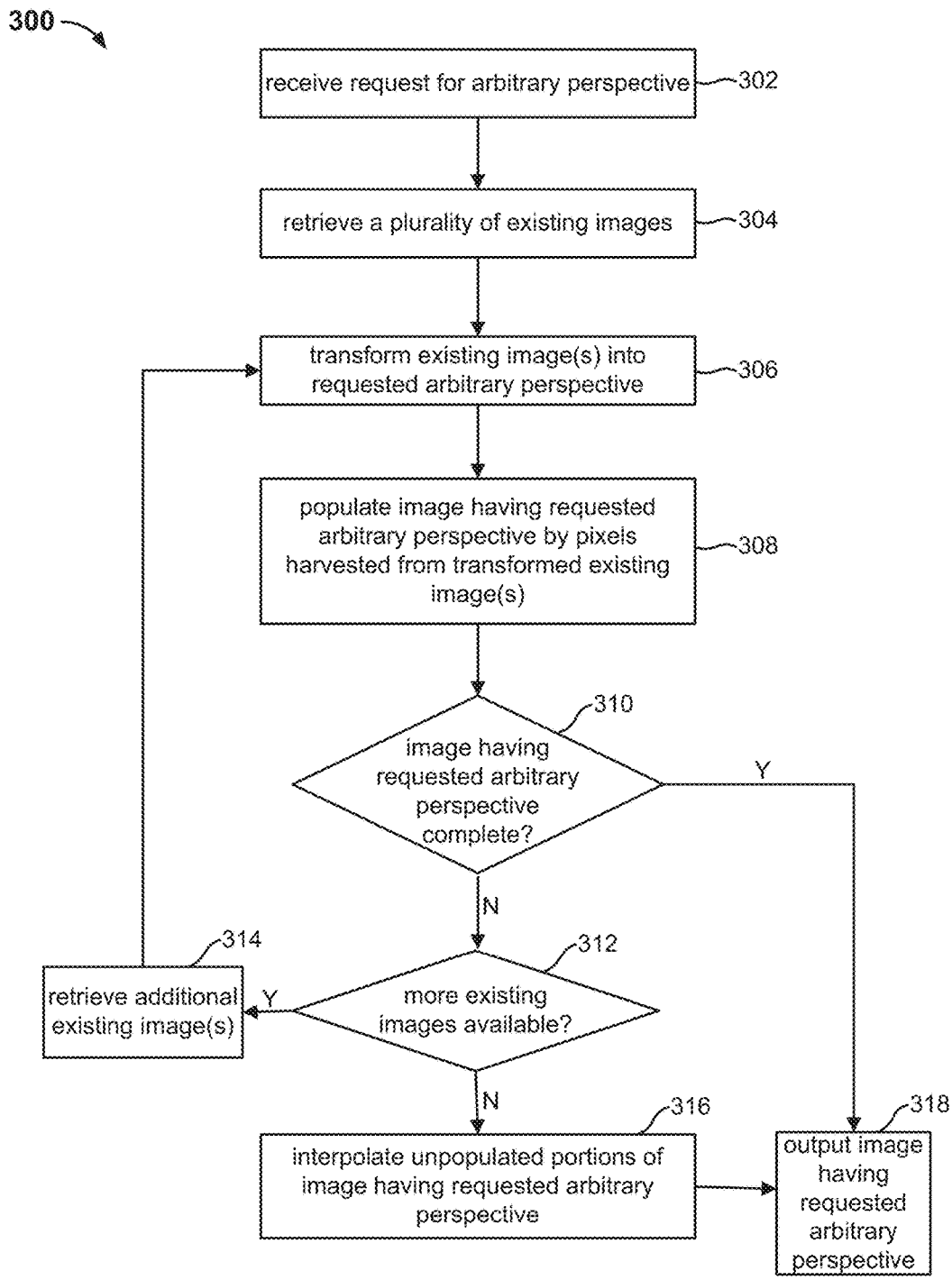
FIG. 3 is a flow chart illustrating an embodiment of a process for generating an arbitrary perspective.

FIG. 3 is a flow chart illustrating an embodiment of a process for generating an arbitrary perspective. Process 300 may be employed, for example, by arbitrary view generator 102 of FIG. 1. In various embodiments, process 300 may be employed to generate an arbitrary view of a prescribed asset or an arbitrary ensemble view.

Process 300 starts at step 302 at which a request for an arbitrary perspective is received. In some embodiments, the request received at step 302 may comprise a request for an arbitrary perspective of a prescribed scene that is different from any existing available perspectives of the scene. In such cases, for example, the arbitrary perspective request may be received in response to a requested change in perspective of a presented view of the scene. Such a change in perspective may be facilitated by changing or manipulating a virtual camera associated with the scene, such as by panning the camera, changing the focal length, changing the zoom level, etc. Alternatively, in some embodiments, the request received at step 302 may comprise a request for an arbitrary ensemble view. As one example, such an arbitrary ensemble view request may be received with respect to an application that allows a plurality of independent objects to be selected and provides a consolidated, perspective-corrected ensemble view of the selected objects.

At step 304, a plurality of existing images from which to generate at least a portion of the requested arbitrary perspective is retrieved from one or more associated assets databases. The plurality of retrieved images may be associated with a prescribed asset in the cases in which the request received at step 302 comprises a request for an arbitrary perspective of a prescribed asset or may be associated with a plurality of assets in the cases in which the request received at step 302 comprises a request for an arbitrary ensemble view.

At step 306, each of the plurality of existing images retrieved at step 304 that has a different perspective is transformed into the arbitrary perspective requested at step 302. Each of the existing images retrieved at step 304 includes associated perspective information. The perspective of each image is defined by the camera characteristics associated with generating that image such as relative position, orientation, rotation, angle, depth, focal length, aperture, zoom level, lighting information, etc. Since complete camera information is known for each image, the perspective transformation of step 306 comprises a simple mathematical operation. In some embodiments, step 306 also optionally includes a lighting transformation so that all images are consistently normalized to the same desired lighting conditions.

At step 308, at least a portion of an image having the arbitrary perspective requested at step 302 is populated by pixels harvested from the perspective-transformed existing images. That is, pixels from a plurality of perspective-corrected existing images are employed to generate an image having the requested arbitrary perspective.

At step 310, it is determined whether the generated image having the requested arbitrary perspective is complete. If it is determined at step 310 that the generated image having the requested arbitrary perspective is not complete, it is determined at step 312 whether any more existing images are available from which any remaining unpopulated pixels of the generated image may be mined. If it is determined at step 312 that more existing images are available, one or more additional existing images are retrieved at step 314, and process 300 continues at step 306.

If it is determined at step 310 that the generated image having the requested arbitrary perspective is not complete and if it is determined at step 312 that no more existing images are available, any remaining unpopulated pixels of the generated image are interpolated at step 316. Any one or more appropriate interpolation techniques may be employed at step 316.

If it is determined at step 310 that the generated image having the requested arbitrary perspective is complete or after interpolating any remaining unpopulated pixels at step 316, the generated image having the requested arbitrary perspective is output at step 318. Process 300 subsequently ends.

As described, the disclosed techniques may be used to generate an arbitrary perspective based on other existing perspectives. Normalizing different existing perspectives into a common, desired perspective is possible since camera information is preserved with each existing perspective. A resulting image having the desired perspective can be constructed from mining pixels from perspective-transformed existing images. The processing associated with generating an arbitrary perspective using the disclosed techniques is not only fast and nearly instantaneous but also results in a high quality output, making the disclosed techniques particularly powerful for interactive, real-time graphics applications.

The disclosed techniques furthermore describe the generation of an arbitrary ensemble view comprising a plurality of objects by using available images or views of each of the plurality of objects. As described, perspective transformation and/or normalization allow pixels comprising independently captured or rendered images or views of the plurality of objects to be consistently combined into a desired arbitrary ensemble view.

In some embodiments, it may be desirable to first build or assemble a scene or ensemble view by selecting and positioning content desired to be included in the scene or ensemble view. In some such cases, a plurality of objects may be stacked or combined like building blocks to create a composite object comprising a scene or ensemble view. As an example, consider an interactive application in which a plurality of independent objects are selected and appropriately placed, e.g., on a canvas, to create a scene or ensemble view. The interactive application, for instance, may comprise a visualization or modeling application. In such an application, arbitrary views of objects cannot be employed to construct a scene or ensemble view due to perspective distortions arising from associated focal lengths. Rather, prescribed object views that are substantially free of perspective distortion are employed as described next.

Orthographic views of objects are in some embodiments employed to model or define a scene or ensemble view comprising a plurality of independent objects. An orthographic view comprises a parallel projection that is approximated by a (virtual) camera positioned at a large distance relative to its size from the subject of interest and having a relatively long focal length so that rays or projection lines are substantially parallel. Orthographic views comprise no or fixed depths and hence no or little perspective distortions. As such, orthographic views of objects may be employed similarly to building blocks when specifying an ensemble scene or a composite object. After an ensemble scene comprising an arbitrary combination of objects is specified or defined using such orthographic views, the scene or objects thereof may be transformed into any desired camera perspective using the arbitrary view generation techniques previously described with respect to the description of FIGS. 1-3.

In some embodiments, the plurality of views of an asset stored in database 106 of system 100 of FIG. 1 includes one or more orthographic views of the asset. Such orthographic views may be captured (e.g., photographed or scanned) or rendered from a three-dimensional polygon mesh model. Alternatively, an orthographic view may be generated from other views of an asset available in database 106 according to the arbitrary view generation techniques described with respect to the description of FIGS. 1-3.

Figure 4A:
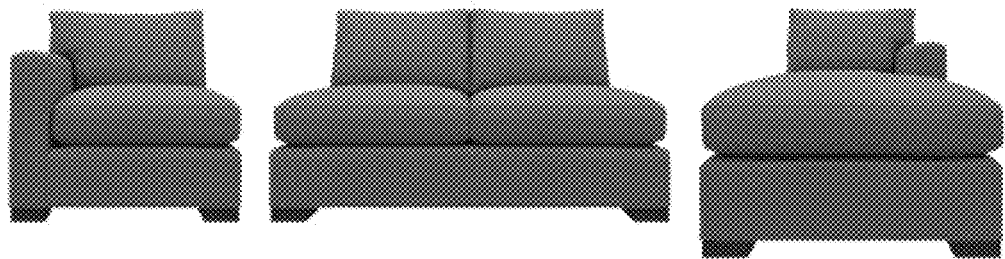
FIGS. 4A-4N illustrate examples of an embodiment of an application in which independent objects are combined to generate an ensemble or composite object.
Figure 4B:
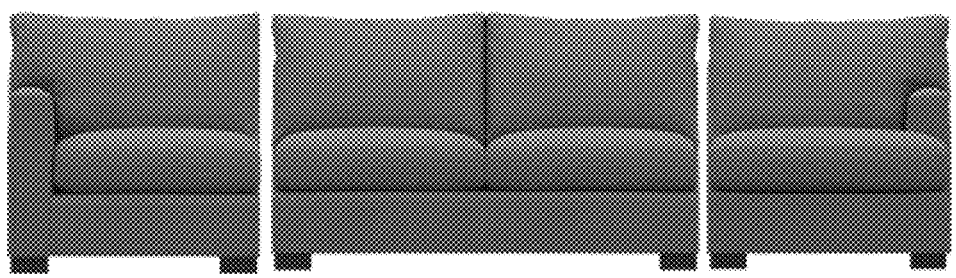
Figure 4C:
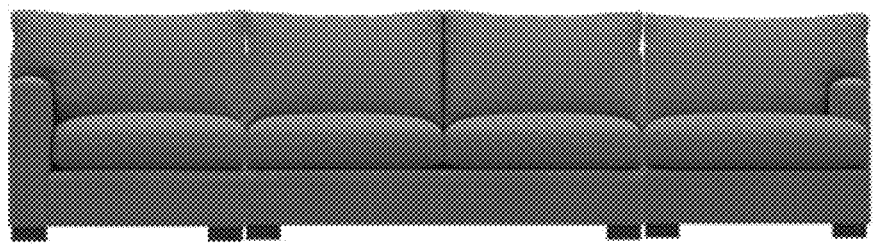
Figure 4D:
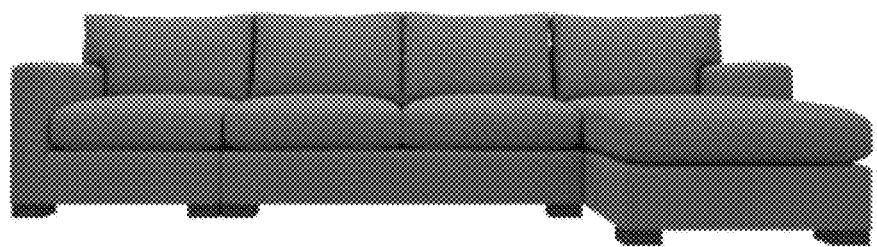
Figure 4E:
Figure 4F:
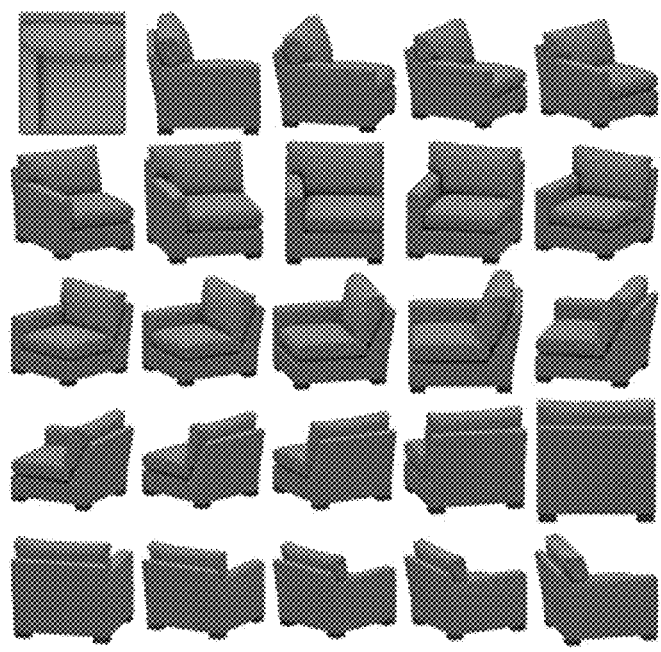
Figure 4G:
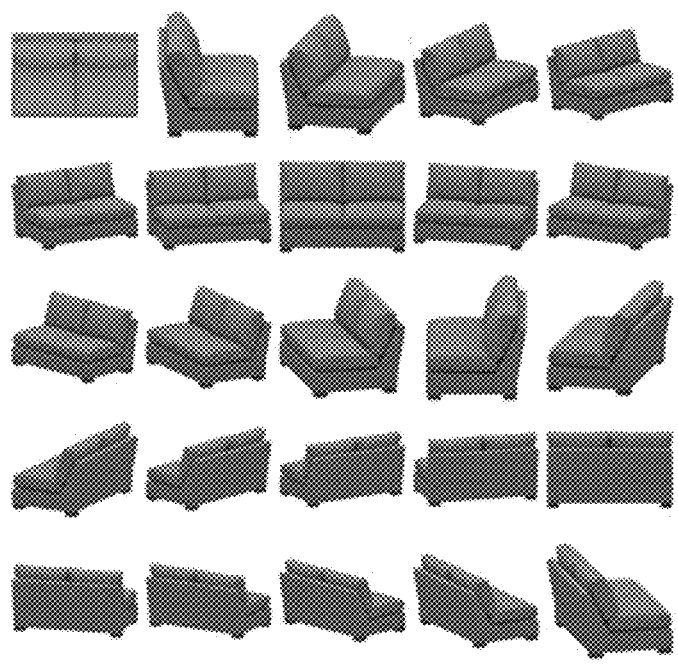
Figure 4H:
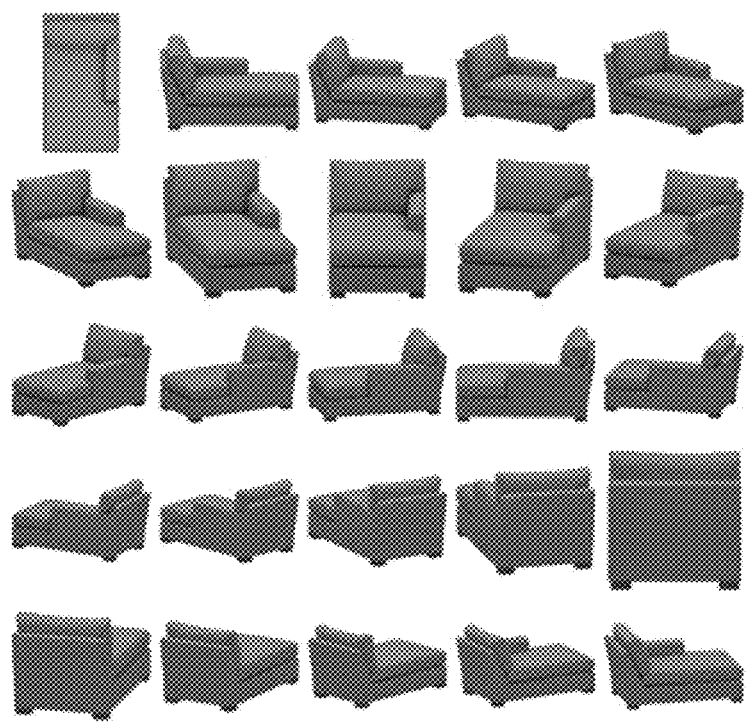
Figure 4I:
Figure 4J:
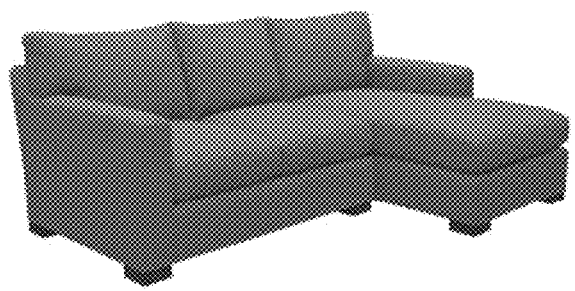
Figure 4K:
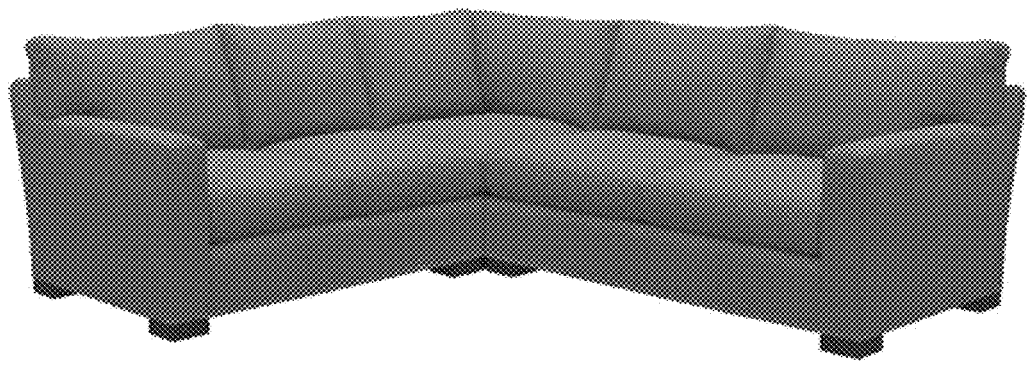
Figure 4L:
Figure 4M:
Figure 4N:
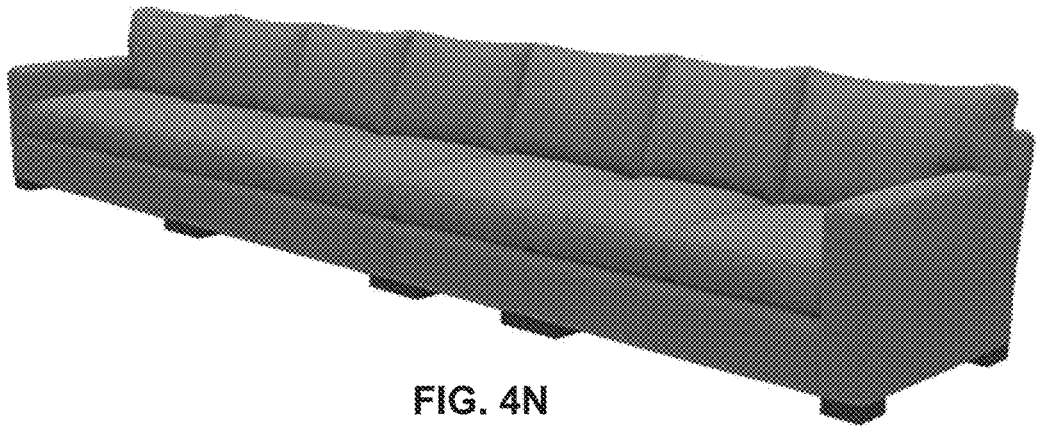

FIGS. 4A-4N illustrate examples of an embodiment of an application in which independent objects are combined to generate an ensemble or composite object or scene. Specifically, FIGS. 4A-4N illustrate an example of a furniture building application in which various independent seating components are combined to generate different sectional configurations.

FIG. 4A illustrates an example of perspective views of three independent seating components—a left-arm chair, an armless loveseat, and a right-arm chaise. The perspective views in the example of FIG. 4A each have a focal length of 25 mm. As can be seen, the resulting perspective distortions prevent stacking of the components next to each other, i.e., side-by-side placement of the components, which may be desired when building a sectional configuration comprising the components.

FIG. 4B illustrates an example of orthographic views of the same three components of FIG. 4A. As depicted, the orthographic views of the objects are modular or block-like and amenable to being stacked or placed side-by-side. However, depth information is substantially lost in the orthographic views. As can be seen, all three components appear to have the same depth in the orthographic views despite the actual differences in depth that are visible in FIG. 4A, especially with respect to the chaise.

FIG. 4C illustrates an example of combining the orthographic views of the three components of FIG. 4B to specify a composite object. That is, FIG. 4C shows the generation of an orthographic view of a sectional via side-by-side placement of the orthographic views of the three components of FIG. 4B. As depicted in FIG. 4C, the bounding boxes of the orthographic views of the three seating components fit perfectly next to each other to create the orthographic view of the sectional. That is, the orthographic views of the components facilitate user friendly manipulations of the components in a scene as well as accurate placement.

FIGS. 4D and 4E each illustrate an example of transforming the orthographic view of the composite object of FIG. 4C to an arbitrary camera perspective using the arbitrary view generation techniques previously described with respect to the description of FIGS. 1-3. That is, the orthographic view of the composite object is transformed into a normal camera perspective that accurately portrays depth in each of the examples of FIGS. 4D and 4E. As depicted, the relative depth of the chaise with respect to the chair and loveseat that was lost in the orthographic views is visible in the perspective views of FIGS. 4D and 4E.

FIGS. 4F, 4G, and 4H illustrate examples of a plurality of orthographic views of the left-arm chair, armless loveseat, and right-arm chaise, respectively. As previously described, any number of different views or perspectives of an asset may be stored in database 106 of system 100 of FIG. 1. The sets of FIGS. 4F-4H include twenty-five orthographic views corresponding to different angles around each asset that are independently captured or rendered and stored in database 106 and from which any arbitrary view of any combination of objects may be generated. In furniture building applications, for instance, the top views may be useful for ground placement while the front views may be useful for wall placement. In some embodiments, in order to maintain a more compact reference data set, only a prescribed number of orthographic views are stored for an asset in database 106 from which any arbitrary view of the asset may be generated.

FIGS. 4I-4N illustrate various examples of generating arbitrary views or perspectives of arbitrary combinations of objects. Specifically, each of FIGS. 4I-4N illustrates generating an arbitrary perspective or view of a sectional comprising a plurality of independent seating objects or components. Each arbitrary view may be generated, for example, by transforming one or more orthographic (or other) views of the objects comprising an ensemble view or composite object to the arbitrary view and harvesting pixels to populate the arbitrary view and possibly interpolating any remaining missing pixels using the arbitrary view generation techniques previously described with respect to the description of FIGS. 1-3.

As previously described, each image or view of an asset in database 106 may be stored with corresponding metadata such as relative object and camera location and orientation information as well as lighting information. Metadata may be generated when rendering a view from a three-dimensional polygon mesh model of an asset, when imaging or scanning the asset (in which case depth and/or surface normal data may be estimated), or a combination of both.

A prescribed view or image of an asset comprises pixel intensity values (e.g., RGB values) for each pixel comprising the image as well as various metadata parameters associated with each pixel. In some embodiments, one or more of the red, green, and blue (RGB) channels or values of a pixel may be employed to encode the pixel metadata. The pixel metadata, for example, may include information about the relative location or position (e.g., x, y, and z coordinate values) of the point in three-dimensional space that projects at that pixel. Furthermore, the pixel metadata may include information about surface normal vectors (e.g., angles made with the x, y, and z axes) at that position. Moreover, the pixel metadata may include texture mapping coordinates (e.g., u and v coordinate values). In such cases, an actual pixel value at a point is determined by reading the RGB values at the corresponding coordinates in a texture image.

The surface normal vectors facilitate modifying or varying the lighting of a generated arbitrary view or scene. More specifically, re-lighting a scene comprises scaling pixel values based on how well the surface normal vectors of the pixels match the direction of a newly added, removed, or otherwise altered light source, which may at least in part be quantified, for example, by the dot product of the light direction and normal vectors of the pixels. Specifying pixel values via texture mapping coordinates facilitates modifying or varying the texture of a generated arbitrary view or scene or part thereof. More specifically, the texture can be changed by simply swapping or replacing a referenced texture image with another texture image having the same dimensions.

The disclosed arbitrary view generation techniques are effectively based on relatively low computational cost perspective transformations and/or lookup operations. An arbitrary (ensemble) view may be generated by simply selecting the correct pixels and appropriately populating the arbitrary view being generated with those pixels. In some cases, pixel values may optionally be scaled, e.g., if lighting is being adjusted. The low storage and processing overhead of the disclosed techniques facilitate fast, real-time or on-demand generation of arbitrary views of complex scenes that are of comparable quality to the high definition reference views from which they are generated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        retrieve, for each of a plurality of objects, a corresponding set of views;
        transform the set of views of each of the plurality of objects to a requested perspective, wherein each view of the transformed sets of views has at least some missing pixels at positions introduced in the requested perspective that are not present in an original perspective of that view; and
        generate an ensemble view comprising the plurality of objects that has the requested perspective at least in part by combining pixels from the transformed sets of views of the plurality of objects; and
    a memory coupled to the processor and configured to provide the processor with instructions.

2. The system of claim 1, wherein the sets of views corresponding to the plurality of objects are independently captured, rendered, or both.

3. The system of claim 1, wherein the set of views of each of the plurality of objects comprises photographs, photorealistic renderings, or both.

4. The system of claim 1, wherein the set of views of each of the plurality of objects comprises perspectives that are different than the requested perspective.

5. The system of claim 1, wherein camera characteristics are stored with and known for each retrieved view.

6. The system of claim 5, wherein the camera characteristics include one or more of: position, orientation, rotation, angle, depth, focal length, aperture, zoom level, and lighting information.

7. The system of claim 1, wherein to generate the ensemble view comprises to interpolate one or more pixels of the ensemble view.

8. The system of claim 1, wherein the ensemble view comprises one or more of a virtual environment, a view of a three-dimensional space, and a frame of an animation or video sequence.

9. The system of claim 1, wherein the ensemble view comprises a composite object.

10. The system of claim 1, wherein the set of views of each of the plurality of objects at least in part comprises orthographic views.

11. The system of claim 1, wherein the set of views of each of the plurality of objects at least in part comprises orthographic views from a plurality of angles.

12. The system of claim 1, wherein the processor is further configured to receive a specification of the ensemble view in terms of orthographic views of the plurality of objects.

13. The system of claim 12, wherein orthographic views of the plurality of objects facilitate manipulation and accurate placement of the plurality of objects comprising the ensemble view.

14. The system of claim 1, wherein each retrieved view comprises metadata including relative object and camera location and orientation.

15. The system of claim 1, wherein each retrieved view comprises pixel metadata including relative position coordinates of a point in three-dimensional space that projects at a pixel.

16. The system of claim 1, wherein each retrieved view comprises pixel metadata including surface normal vectors relative to coordinate axes.

17. The system of claim 1, wherein each retrieved view comprises pixel metadata including texture mapping coordinates.

18. The system of claim 1, wherein each retrieved view comprises pixel metadata and wherein RGB values of a pixel encode pixel metadata.

19. A method, comprising:
for each of a plurality of objects, retrieving a corresponding set of views;
transforming the set of views of each of the plurality of objects to a requested perspective, wherein each view of the transformed sets of views has at least some missing pixels at positions introduced in the requested perspective that are not present in an original perspective of that view; and
generating an ensemble view comprising the plurality of objects that has the requested perspective at least in part by combining pixels from the transformed sets of views of the plurality of objects.

20. A computer program product embodied in a non-transitory computer readable storage medium and comprising computer instructions for:
for each of a plurality of objects, retrieving a corresponding set of views;
transforming the set of views of each of the plurality of objects to a requested perspective, wherein each view of the transformed sets of views has at least some missing pixels at positions introduced in the requested perspective that are not present in an original perspective of that view; and
generating an ensemble view comprising the plurality of objects that has the requested perspective at least in part by combining pixels from the transformed sets of views of the plurality of objects.

21. The method of claim 19, wherein the sets of views corresponding to the plurality of objects are independently captured, rendered, or both.

22. The method of claim 19, wherein the set of views of each of the plurality of objects comprises photographs, photorealistic renderings, or both.

23. The method of claim 19, wherein the set of views of each of the plurality of objects comprises perspectives that are different than the requested perspective.

24. The method of claim 19, wherein camera characteristics are stored with and known for each retrieved view.

25. The method of claim 24, wherein the camera characteristics include one or more of: position, orientation, rotation, angle, depth, focal length, aperture, zoom level, and lighting information.

26. The method of claim 19, wherein generating the ensemble view comprises interpolating one or more pixels of the ensemble view.

27. The method of claim 19, wherein the ensemble view comprises one or more of a virtual environment, a view of a three-dimensional space, and a frame of an animation or video sequence.

28. The method of claim 19, wherein the ensemble view comprises a composite object.

29. The method of claim 19, wherein the set of views of each of the plurality of objects at least in part comprises orthographic views.

30. The method of claim 19, wherein the set of views of each of the plurality of objects at least in part comprises orthographic views from a plurality of angles.

31. The method of claim 19, further comprising receiving a specification of the ensemble view in terms of orthographic views of the plurality of objects.

32. The method of claim 31, wherein orthographic views of the plurality of objects facilitate manipulation and accurate placement of the plurality of objects comprising the ensemble view.

33. The method of claim 19, wherein each retrieved view comprises metadata including relative object and camera location and orientation.

34. The method of claim 19, wherein each retrieved view comprises pixel metadata including relative position coordinates of a point in three-dimensional space that projects at a pixel.

35. The method of claim 19, wherein each retrieved view comprises pixel metadata including surface normal vectors relative to coordinate axes.

36. The method of claim 19, wherein each retrieved view comprises pixel metadata including texture mapping coordinates.

37. The method of claim 19, wherein each retrieved view comprises pixel metadata and wherein RGB values of a pixel encode pixel metadata.

38. The computer program product of claim 20, wherein the sets of views corresponding to the plurality of objects are independently captured, rendered, or both.

39. The computer program product of claim 20, wherein the set of views of each of the plurality of objects comprises photographs, photorealistic renderings, or both.

40. The computer program product of claim 20, wherein the set of views of each of the plurality of objects comprises perspectives that are different than the requested perspective.

41. The computer program product of claim 20, wherein camera characteristics are stored with and known for each retrieved view.

42. The computer program product of claim 41, wherein the camera characteristics include one or more of: position, orientation, rotation, angle, depth, focal length, aperture, zoom level, and lighting information.

43. The computer program product of claim 20, wherein generating the ensemble view comprises interpolating one or more pixels of the ensemble view.

44. The computer program product of claim 20, wherein the ensemble view comprises one or more of a virtual environment, a view of a three-dimensional space, and a frame of an animation or video sequence.

45. The computer program product of claim 20, wherein the ensemble view comprises a composite object.

46. The computer program product of claim 20, wherein the set of views of each of the plurality of objects at least in part comprises orthographic views.

47. The computer program product of claim 20, wherein the set of views of each of the plurality of objects at least in part comprises orthographic views from a plurality of angles.

48. The computer program product of claim 20, further comprising computer instructions for receiving a specification of the ensemble view in terms of orthographic views of the plurality of objects.

49. The computer program product of claim 48, wherein orthographic views of the plurality of objects facilitate manipulation and accurate placement of the plurality of objects comprising the ensemble view.

50. The computer program product of claim 20, wherein each retrieved view comprises metadata including relative object and camera location and orientation.

51. The computer program product of claim 20, wherein each retrieved view comprises pixel metadata including relative position coordinates of a point in three-dimensional space that projects at a pixel.

52. The computer program product of claim 20, wherein each retrieved view comprises pixel metadata including surface normal vectors relative to coordinate axes.

53. The computer program product of claim 20, wherein each retrieved view comprises pixel metadata including texture mapping coordinates.

54. The computer program product of claim 20, wherein each retrieved view comprises pixel metadata and wherein RGB values of a pixel encode pixel metadata.

* * * * *